Aug. 16, 1932.  H. H. BUCKMAN  1,871,877
APPARATUS FOR CORRELATING SPACED POINTS OF OBSERVATION
Filed June 25, 1929
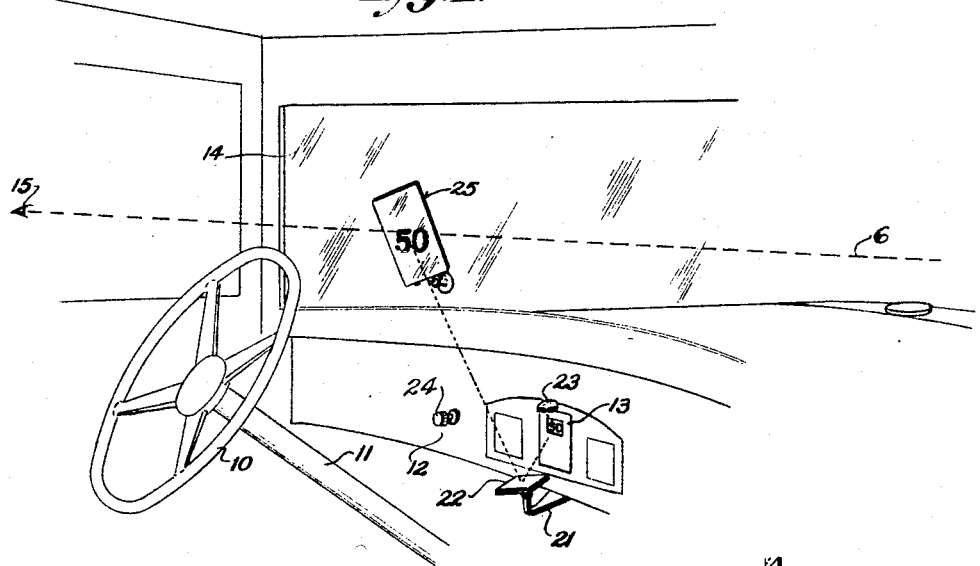
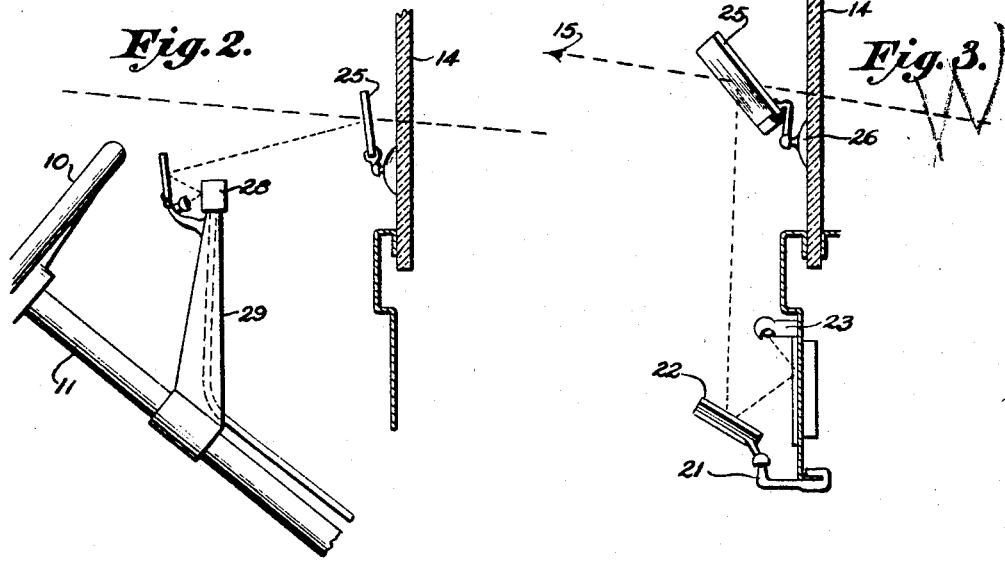
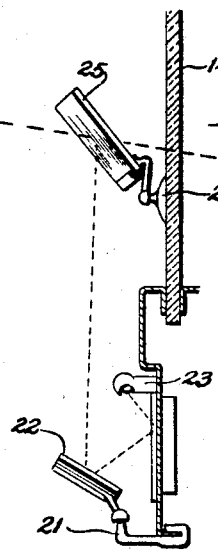
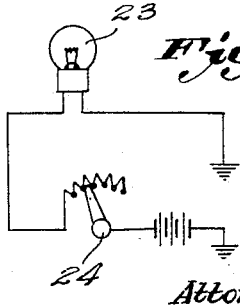
Inventor
Henry H. Buckman
by Barton A. Beau Jr.
Attorney Patented Aug. 16, 1932

1,871,877

UNITED STATES PATENT OFFICE

HENRY H. BUCKMAN, OF JACKSONVILLE, FLORIDA, ASSIGNOR OF ONE-HALF TO ROLAND LORD O'BRIAN, OF BUFFALO, NEW YORK

APPARATUS FOR CORRELATING SPACED POINTS OF OBSERVATION

Application filed June 25, 1929. Serial No. 373,623.

This invention relates to an apparatus for correlating spaced and separate points of observation utilized in the control of a moving object, to the end that such control may be made more efficient with a diminution in fatigue in the eye of the observer.

The problem herein presented and solved relates to the proper control of moving vehicles, such as automobiles, railway trains, vessels, airplanes, or the like, or those bodies which are moved under controlled conditions by instrumentalities under the supervision of an operator on the body. Such control is universally exercised, or may be exercised, by providing instruments accessible to the view of the operator, which indicate the functioning of the operating mechanism and the moving body, and so inform the operator of changes which should be made in the instrumentalities governing the speed and direction of the body. For example, it is customary to provide speed indicators for such moving bodies, oil gauges, ammeters, or the like, and also special instruments for specific machines, such as the altimeter for an air craft.

Indicating instruments of this character have heretofore been disposed at a point or region accessible to the eye of the operator, but outside of the normal field of operating vision. For example, they may be mounted on the dashboard or instrument panel of an automobile, where they do not interfere with or obstruct the view ahead. While accessible, the reading of these instruments necessitates the removal of the eye of the observer or operator from the path of travel, and, while such lapse of concentration upon the road is not necessarily serious in all cases, it is well known that it introduces a factor of increased danger.

It is universally recognized and is a matter of common experience that the eyes of a train or automobile operator should be concentrated upon the roadway ahead if danger is to be avoided and if the moving car is to be kept under proper control. Such concentration can not be maintained at every instant, however, as it is also necessary to observe the indicating instruments at intervals, to make sure that the machine is moving at a safe speed, or that the engine is operating in an efficient manner. The dangers incident to the shifting of the line of vision are particularly well illustrated by the operation of motor vehicles, which are often driven at high speeds, and at night, when the power of accommodation of the eye to regain a proper focus for the road ahead is seriously taxed.

Accordingly, the present invention contemplates the bringing of the various indicating instrument indicia into the normal line of operating vision for the vehicle operator, to obviate the necessity for a continual shifting of the eye from the path of travel to the indicating instruments, with its attendant hazards. This result is variously accomplished by employing a light source for illuminating the indicia to form a beam of light corresponding in section to the figure or symbol to be observed, which beam is reflected, by means of a prism or mirror, into the region of the line of normal observation, and is there arrested so that the indicia always appear in line with the eye of the observer concentrated upon the roadway ahead.

The principles of the invention may be applied by means of numerous physical embodiments and apparatus, suited to the particular conditions encountered and to the type of body to be driven and controlled. These specifications, therefore, will be limited to certain exemplary applications of the invention to automobiles, it being understood that the invention is capable of more extensive use, as hereinabove pointed out.

The various objects and advantages peculiar to the general principles just stated, and to the specific embodiments hereinafter described, will be made apparent from a consideration of the following description, taken in connection with the accompanying drawing, wherein:

Fig. 1 is a fragmentary view in perspective showing certain customary parts of an automobile together with one form of the invention associated therewith;

Fig. 2 is a fragmentary longitudinal cross-sectional view taken adjacent the steering post of an automobile, showing another form of the invention;

Fig. 3 is a view similar to Fig. 2, illustrating the apparatus shown in Fig. 1 for employing the invention; and Fig. 4 is a schematic view illustrating the wiring connections between a lamp and a rheostat for varying the intensity of illumination.

In Fig. 1 of the drawing, there are illustrated some of the usual parts of an automobile adjacent the driver's seat, or the control position for the operator of the moving body. These include the steering wheel 10 and column 11, the instrument panel 12 having mounted thereon the usual indicating control instruments, such as a speedometer 13, and the windshield 14 through which the operator looks to see the field into which the vehicle is moving.

The normal control field of a moving body such as an automobile embraces the roadway and its adjuncts in advance of the car. It is into this region that the driver normally concentrates his vision under conditions of careful driving. It is well known that some drivers concentrate their vision on a point in advance of the car at the center of the road, while others concentrate on the right-hand edge of the road. The absolute direction of the normal line of vision is, therefore, somewhat variable, but it usually coincides fairly well with a line projected from the eye of the driver, (as indicated by the numeral 15), through the windshield 14, and passing through or near the radiator cap 16 of the automobile. This imaginary line, meeting as it does the customary operating conditions, will hereinafter be referred to for example's sake as a normal line of vision into the control field in advance of the car. As will be readily understood, the objects in this control field are constantly changing and the field itself is in motion with respect to the driver.

The control instruments, such as the speedometer 13, constitute a second control vision field which is relatively fixed with respect to the driver, and which is remote from the normal control field. As is well known, it is practically impossible for a careful driver to observe the instrument at the same time he is giving proper attention to the conditions on the roadway ahead. However, all drivers glance occasionally at the instruments, to determine whether the engine is functioning properly, or, more often, to determine the speed at which the car is moving. This change of concentration in vision introduces a factor of danger, since the human eye is susceptible of certain weaknesses making it difficult to change the optical focus from the road to the instrument and again to the roadway in the short space of time which should be devoted for this purpose. The element of danger is enhanced by the frailities of human nature, for, a driver driving his car at an excessive rate of speed is usually inclined to give undue attention to the speedometer reading, and this at a time when he should be devoting all of his attention upon the road. Likewise, the inability to make a satisfactory speedometer reading instantaneously is a disadvantage under conditions of night driving, when the contrasting light and shadows render optical accommodation more difficult, and also the conditions of city traffic driving, curtailed on the one hand by speed regulations, and on the other, by density of traffic, make it difficult to correlate properly the objects which appear in both of the necessary control fields.

Accordingly, the present invention provides means for projecting the index or symbol appearing in the secondary control field into the normal control field where it may be readily observed at all times. The projection of the instantaneous speed reading as appearing on the speedometer 13 will be referred to for example's sake. As shown in Fig. 1, an arm 21 is secured to the underside of the panel 12 and is provided with an upwardly projecting portion upon which is mounted a reflecting mirror or prism 22. This mounting is advantageously in the form of a ball and socket connection, such as is customarily employed in the mounting of rear view mirrors for automobiles. A shielded lamp or other source of illumination 23 is mounted above the speedometer 13 to throw a beam of light on the index, which is reflected onto the plate 22 and thence is reflected upwardly into the region of the normal field of vision. The ball and socket mounting permits of the adjustment of the reflecting device 22 so that the illumination projected therefrom may be directed to any suitable point in the normal control field.

In effecting the illumination of the speedometer symbol in this manner, it is of course necessary to make the numbers representing the speed of a suitable material in order to reflect the proper image. For example, the numbers may be painted on a black band with white paint, so that the number only is reflected. This is an advantage, as it is not necessary to see the entire instrument, but only the index symbol momentarily appearing thereon. Or, if desired, the light 23 may be disposed in back of the numbers, which in that case are perforated so that only the number is projected by means of the beam of light. In certain cases it will be desirable to make certain numbers with transparent colored paper, so that when the critical or safe speed is reached, a red or other colored symbol will appear in the normal field of vision.

The reflecting plate 22 may be made in two or more superimposed portions hinged together so that any one may be placed uppermost to receive the illumination from the index symbol. One of these plates may be provided with a surface of high reflecting power, while another plate is made with a surface of low reflecting power. For bright daylight driving the highly reflecting surface is employed, to get a bright image in the normal operating field of vision, while for night driving when a less intense illumination is sufficient and desirable, the dull reflecting surface may be used. In another way of working, a filter may be interposed in the light path between the index number and the plate 22, while in still another way, the intensity of the light emanating from the lamp 23 may be varied by means of a rheostat, such as is indicated in Fig. 1 by the numeral 24, the wiring connections illustrated in Fig. 4 being merely conventional.

Disposed in the normal field of vision is a screen 25 mounted either on the windshield or on the body by means of a ball and socket connection or a suction cup device, as indicated at 26 in Fig. 3. The windshield itself may be used as the arresting screen, provided the glass is not so thick as to form an undesirable double image, and further provided that it is so positioned to reflect the ray incident thereto into the normal line of vision of the operator. Due to the facilities for adjustment inherent in the separate plate 25, its use is preferred.

Advantageously, the arresting plate 25 is made of a transparent medium such as glass or a pyroxalin or cellulose derivative compound. The advantage of transparency is, of course, that the screen does not interfere with normal vision. If desired, the screen may be colored to serve the additional function of a glare shield protecting the eyes of the operator from excessive light coming from approaching vehicles.

In operation, the mirrors 22 and 25 are so adjusted as to project the desired symbol into the normal field of vision where it may be seen by the operator without distracting his attention from the roadway ahead. By using as low an intensity of light as may be, and by employing the transparent arresting screen 25, the image appears in the normal line of vision in a phantom-like fashion and so does not cause any undue distraction on the part of the operator from road conditions ahead.

The apparatus shown in Fig. 2 is similar to that shown in Fig. 1, except for the location of the indicating device. There is usually a "blind spot" directly in front of the upper portion of the steering wheel 10 which can not be seen by the operator. The indicating device 28 shown in Fig. 2 is mounted in this spot by means of a bracket 29 secured to the steering column 11.

The apparatus shown in Fig. 3 is similar to that shown in Fig. 1, and herein the construction of the arm 21 is more clearly illustrated.

From the foregoing description, it will be understood that various specific arrangements may be provided to attain the major objects of the present invention. It will also be understood that the invention may be employed to concentrate into a single field of vision a number of spaced indicating devices, which may be employed in the control of various types of moving vehicles. These various rearrangements of parts and adaptations are to be deemed to fall within the scope of this invention, as defined by the following claims.

I claim:

1. Apparatus, for projecting an image of an indication of the functioning of a moving vehicle into the field of normal operating vision for an operator upon the vehicle, which vehicle includes an indicator provided with symbols, a source of light, and means for projecting the light to the symbol to illuminate the same, comprising, in combination with said vehicle, means for reflecting the illuminated symbol into the field of normal vision.

2. Apparatus, for providing a simultaneous view of a plurality of vision control fields for operating a moving vehicle which includes a control position for the operator thereof, separate fields of vision each including separate control objectives, and means for illuminating a secondary control field having an image of the control indicia therein; comprising, in combination with the vehicle, means for projecting the image into the region of another and normal control field, and means for arresting said projected image to reflect an image of the projected indicia visible in said normal control field.

3. In apparatus as set forth according to claim 2, means for varying the intensity of the projected illumination to control the brightness of the image appearing in the normal control field.

4. In apparatus as set forth according to claim 2, means for setting the arresting means in a plurality of operating positions.

5. In apparatus as set forth according to claim 2, means for varying the direction of the projected illumination to intercept the field of normal operating vision at a plurality of independent points.

6. Apparatus for projecting a speedometer reading into the field of vision forwardly of a moving vehicle, which vehicle is provided with a speedometer, a stationary part adapted to receive the speedometer, and means for illuminating an index symbol appearing thereon; said apparatus comprising a reflector for projecting said illumination into the region of the field of vision forwardly of the vehicle as viewed by an operator therefor, a transparent plate for arresting the projected illumination of the image of the speedometer index symbol visible in said field, and means for mounting the transparent plate upon the vehicle.

HENRY H. BUCKMAN.

Patent No. 1,871,877                                          Granted August 16, 1932

HENRY H. BUCKMAN

The above entitled patent was extended October 30, 1951, under the provisions of the act of June 30, 1950, for 6 years and 214 days from the expiration of the original term thereof.

*Commissioner of Patents.*